United States Patent [19]

Huey et al.

[11] 3,728,817

[45] Apr. 24, 1973

[54] PREVENTING SHEDDING OF POLLEN BY APPLYING BINDER TO CORN TASSELS

[75] Inventors: John Robert Huey, Princeton, Ill.; Otto B. Wurzburg, Oldwick, N.J.; Clyde D. Goldsberry, Minburn, Iowa

[73] Assignees: Moews Seed Company, Granville, Ill.; National Starch and Chemical Corporation, Plainfield, N.J.

[22] Filed: May 28, 1971

[21] Appl. No.: 148,022

[52] U.S. Cl............................47/58, 47/DIG. 1, 47/1.5, 47/1.41
[51] Int. Cl. .................................................A01h 1/02
[58] Field of Search............................47/DIG. 1, 1.41, 47/1.5, 1.7, 58

[56] References Cited

UNITED STATES PATENTS

| | | | |
|---|---|---|---|
| 1,914,364 | 6/1933 | Eggert | 47/1.41 |
| 2,684,555 | 7/1954 | Kantack | 47/1.41 |
| 2,685,149 | 8/1954 | Hvistendahl | 47/1.41 |
| 2,753,663 | 7/1956 | Jones | 47/58 |
| 2,994,599 | 8/1961 | McRae | 47/DIG. 1 |
| 3,143,839 | 4/1967 | Ridgway et al. | 47/1.5 |

FOREIGN PATENTS OR APPLICATIONS 347,744  4/1937  Italy

*Primary Examiner*—Robert E. Bagwill
*Attorney*—Darbo, Robertson & Vandenburgh

[57] ABSTRACT

In raising hybrid corn seed, the necessary exclusion of pollination by pollen from the seed-parent plant is achieved by applying to the tassels of those plants, shortly before pollen-shedding time, a binder which physically prevents the shedding of pollen. The preferred method of application is by driving a high clearance tractor through the field carrying sets of rotating binder-bearing rollers in alignment with the seed-parent plants so that every tassel thereof passes through the bite of a set of rollers, the rollers applying the binder throughout the tassel. Among alternatives are spraying and selectively fogging the tassels. Preferred binders are fine particle dispersions in water of vinyl type homo- or copolymers, such as a copolymer of vinylchloride and butyl acrylate of equal proportions. A great variety of other binders may be used.

13 Claims, 1 Drawing Figure

Patented April 24, 1973
3,728,817
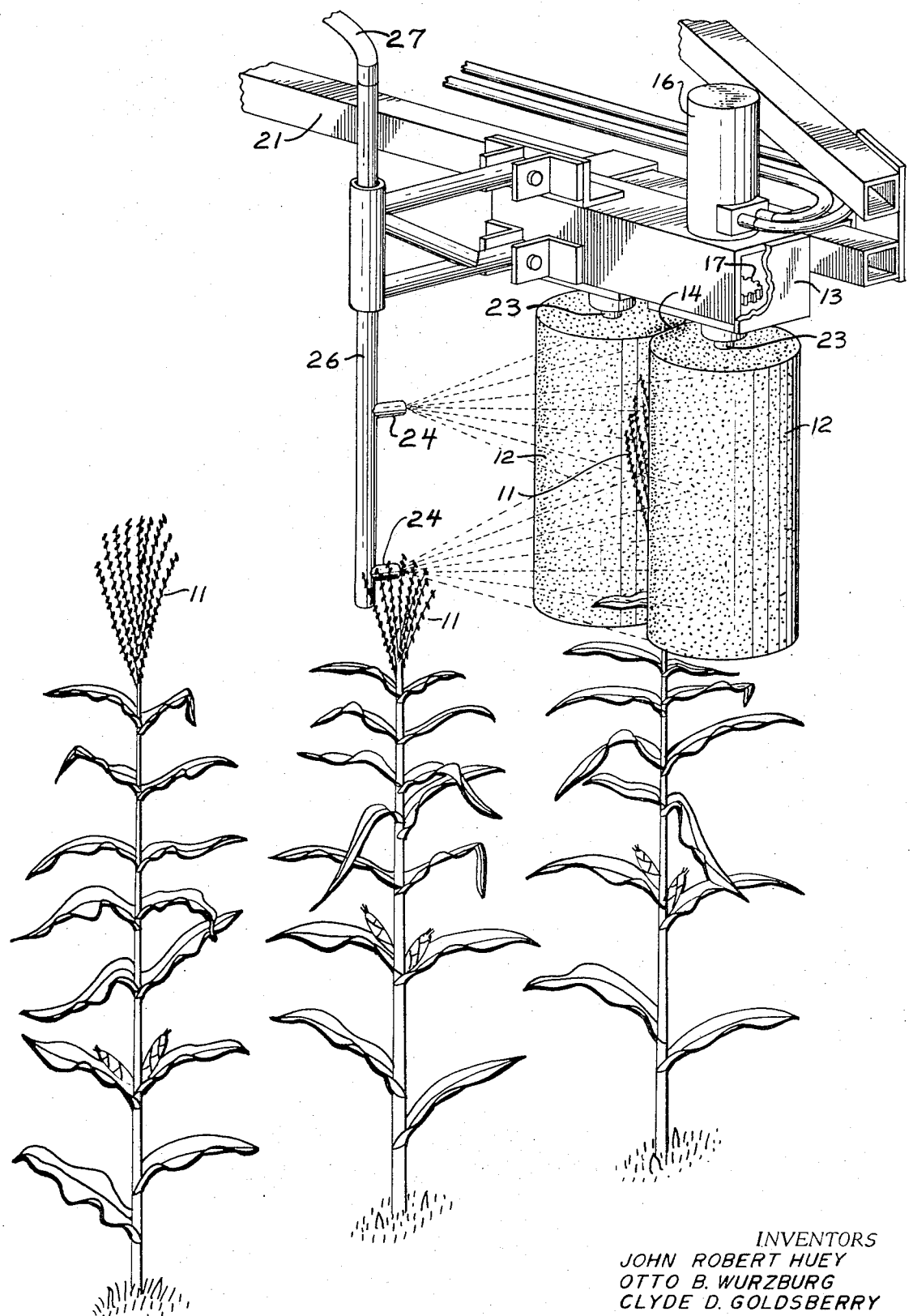
INVENTORS
JOHN ROBERT HUEY
OTTO B. WURZBURG
CLYDE D. GOLDSBERRY
BY Darbo, Robertson & Vandenburgh
ATT'YS.

३,७२८,८१७

PREVENTING SHEDDING OF POLLEN BY APPLYING BINDER TO CORN TASSELS

INTRODUCTION

The invention of which the present disclosure is offered for public dissemination in the event adequate patent protection is available relates to growing hybrid seed, and is especially suitable in the area of hybrid corn. Hybrid seed is, of course, the seed which results from crossing two lines, such as two inbreds; or two single-crosses resulting from crossing two inbreds.

In producing hybrid corn seed commercially, a field is planted with the two lines to be crossed. Some rows are of the "seed-parent" line, the line chosen to function as the female plants, and the other rows are of the other line of corn, chosen to act as the pollinator or male plants. To obtain the hybrid seed it is essential that each female or seed-parent plant shall be pollinated only with pollen from the male-parent or pollinator line. Thus, the resulting seed on the seed-parent plants will all be the desired hybrid seed. It is harvested separately.

In a nursery this result can be achieved by bagging each ear before corn silk appears and removing the bag only for hand-pollination. In crossing fields, however, this is not practicable, and hence there must be substantially no pollen drifting down from the seed-parent plants. Each corn silk first engaged by such pollen would result in an undesirable seed. The old-fashioned way to avoid pollen of the seed-parent plants was to detassel these plants. Detasseling became increasingly unpopular and in recent years was largely avoided by incorporating male-sterility in the seed-parent lines. The 1970 blight affecting these male-sterile lines tends to force a return to the detasseling practice.

Detasseling is not only a nuisance and an expanse, but it also results in leaf damage which reduces yield. The leaf damage and yield reduction tend to be increased if the detasseling labor is reduced by machine cutting. However, even with careful hand pulling of the tassels, proper practice often requires pulling of the top leaf with the tassel to be sure to get all of the tassel. This alone may cost about 3 to 4 percent of the yield.

According to the present invention, pollen-shedding by the tassels of the speed-parent plants in a field is prevented by applying a binder which entraps the pollen grains so they can not be released from the tassel in the critical period. The critical period is while the viable pollen might otherwise be shed and the silks are receptive, this being with reference to the seed-parent plants. When all these silks have been pollinated, or if this pollen has ceased being viable, there is no longer any danger. Without intending limitation in any way as to application techniques, it is at present preferred that the binder be applied by passing between sets of rollers. Spraying has also been successfully used, and other methods are contemplated.

Some of the advantages and objects of the invention may be more apparent from the following description and from the drawings.

DRAWING

The drawing is a somewhat diagrammatic representation of this invention showing pictorially and somewhat diagrammatically preferred form of apparatus for performing the invention. For clarity, the corn is shown somewhat more mature than it would be at the time of treatment by this invention.

THE GIST OF THE INVENTION

The gist of the invention, which is reasonably apparent from the drawings, is to apply to corn tassels 11 (those which must not be permitted to shed pollen) a binder which prevents the pollen from shedding. The binder may be applied in any manner, the spray and roller applications as illustrated being merely an example. Depending on the circumstances, the binder may be of almost any character. Ordinarily, it should be of a form which soon becomes water resistant, as by forming a water resistant film. Any film formed by the binder should have reliable initial coverage throughout the area of application, and when there is hope that a single application will prevent pollen shedding throughout the critical period, the binder should have long water resistance, the ability to bind itself dependably in place, and good elongation so as stay intact in spite of plant growth.

Under some circumstances, particularly when the binder being applied is to be relied upon only for a relatively short portion of the critical period, some of these characteristics are less necessary, and financial considerations may dictate the use of a binder of less durability but lower cost. Situations where a short durability binder would be sufficient include:

a. If a durable binder has been applied before pollen shedding starts, but near the end of the critical period, the growth of the tassels has exposed some uncoated portions which might shed pollen in the remaining short portion of the critical period. Here a short-durability binder may be adequate.

b. If a seed grower prefers detasseling, a short durability binder applied just before pollen would otherwise be shed may enable him to defer detasseling for a short period, such as two to four days. This deferring may be desirable for a variety of reasons including temporary non-availability of the detasseling crew, or wishing to defer detasseling until the tassels are more fully exposed and can be pulled or cut with less damage to the plants.

ILLUSTRATIVE EQUIPMENT FOR APPLICATION OF BINDER

The drawing illustrates a form of apparatus for application of the binder to the tassels which tests already conducted indicate to be suitable. A pair of resilient and porous or absorbent rollers 12 are rotatively mounted as by a bearing box 13 to rotate about vertical axes close enough together to compress the rollers 12 and form a bite 14 between them. At least one of the rollers 12 is driven, as by a rotary hydraulic motor 16. The other roller 12 is driven either by contact with the motor-driven roller 12 or by drive means represented by gear 17. The gear 17 could also be part of speed reducing gearing which enables the motor 16 to rotate relatively fast while the rollers 12 are rotating slowly. This would be especially desirable if an ordinary electric motor were used in place of the hydraulic motor 16.

Preferably the set of rollers 12 is carried by a boom 21 which in turn is carried by and moved along the rows of corn by a high-clearance tractor (not shown)

such as is already commonly used for detasseling, and for spraying for parasite or weed control. The boom 21 would have a set of rollers 12 on it for each of the rows of seed-parent plants passing under the boom so that one pass of the tractor would apply binder to all of the seed-parent plants within reach. Preferably, this would include all of the seed-parent plants in one block, separated from other blocks by rows of pollinator plants.

The rollers 12 preferably rotate at a peripheral speed equal to the speed of movement of the boom 21 along the row, and in opposite directions such that at the bite 14 the surface speed of the rollers is substantially zero, and each tassel can pass through the moving bite with little or no pull being exerted upon the tassel.

If the rollers 12 are porous, the binder may be supplied to them through hollow shafts 23 by which they are carried and rotated. In that event box 13 may serve as a supply manifold. However, for simplicity of illustration, and because already proved to be suitable, the drawing illustrates application of the binder through spray nozzles 24 mounted on a header 26 and supplied by a hose or other conduit 27. The spray nozzles 24 may be directed against any part of the surface of either of the rollers 12, preferably the driven roller if only one is directly motor driven. However, the nozzles 24 have been illustrated as being directed at the area where both rollers 12 approach the bite 14, and hence the nozzles also spray binder directly onto the tassels 11 as they approach the bite.

As a matter of fact, successful results have been attained by spraying without the rollers 12. In that event sprays should be directed from both sides, and have a wide angle of spread to attack the tassels from various angles. There is then likely to be considerable wastage of the binder. By spraying onto the rollers 12, there can be an excess of binder at the bite to ensure contact with all exposed parts of the tassel, even though the rate of supply by the spray nozzles 24 is carefully regulated to be close to the safe minimum for adequate prevention of pollen shedding.

If desired, guide plates may be angularly disposed in front of the rollers 12 to guide the tassels into the path of the converging or central portions of the rollers 12 so that the rolling action will dependably direct the tassels into the bite. However, it is believed to be practicable to use rollers 12 of large enough diameter so that the guide plates will not be necessary unless in relatively severe winds. The inbred and single-cross lines commonly used for growing hybrid corn seed grow with great consistency and dependability as to their uniformity, and with mechanical corn planting the spacing of the rows is also very uniform.

Various methods of speed control for the rollers 12, and of flow control for the binder (whether applied by nozzles 24 or otherwise) may be used. Ideally, both would be varied automatically in proportion to variations of vehicle speed, although the quantity of binder to be supplied per linear foot of vehicle movement should be adjustable by the operator. Of course, prior to working out such sophisticated automatic correlation, the tractor can simply be moved at a uniform speed, and the feed of binder manually adjusted to be suitable for that speed.

Another method of application of the binder which some growers or equipment manufacturers may prefer is fogging. For this form, a fogging box open or slotted at its front, rear and bottom will be moved along each row so that the tassels pass through it; and a fogging atmosphere of binder will be maintained within the box. The length of the box may be chosen as experience proves to be necessary to keep the tassel within the moving fog zone for as long as is needed for proper coating or binding action. A box length of 5 feet is deemed to be suitable for common tractor speeds such as 3 to 5 mph.

Consideration will no doubt be given within the concept of the present invention to a wide variety of other methods of application. One already proposed is to bend the tassels down with a guide plate and then let them spring into the bite of a set of rollers having horizontal or sloping axes. It seems inevitable that this form would exert some pulling force on the plant, but with low contact pressure some surfaces such as long heavy pile may not pull excessively, and the wiping or brushing or stroking action resulting could even prove desirable. If this action proves to be desirable, it can also be attained, without depressing the tassels downwardly by an advance guide plate, by mounting the rolls on tilted axes, with the tops of the rollers substantially in advance of the bottoms. If such rollers are driven with a speed such that the bite portions thereof have substantially zero horizontal component of speed, they will have some upward speed to provide the stroking action.

Some lines of corn may be found to be more reliably safeguarded against pollen shedding by one method of application than by another, even though this may not be true as to other lines. For example, if a line has a characteristic of concealing its lower anthers within leaf whorls, the most dependable penetration of the leaf whorl may be important, and a downwardly directed spray in this area may be best. It is also possible that with such plants the present invention will be successful only in delaying the time when detasseling must be resorted to. On the basis of present information, relatively few lines are expected to present any such problem.

Another method which has been considered for practicing the present invention involves dusting the tassels with dry binder powder, the application of water following or preceding. The water might well include a wetting agent. Of course, a wetting or spreading agent may be included in water carried binders too, but this has not so far been found to be necessary.

ROLLER CONSTRUCTION AND SUPPLY

Rollers 12 can be made of various materials. Polyfoam paint rollers have been used successfully in experiments. Foam or sponge rubber is deemed clearly suitable. Also, roll cores (which may be rigid) can be covered with resilient sleeves. Such sleeves may be of foam material, or may have their outer surfaces formed by pile or other nap, preferably long, thick and resilient. Any absorbent soft material could probably be used provided that sufficient resiliency is present to press out substantially all around the tassel portions which impress themselves in the rollers as the tassels pass between them.

Although a single pair of rollers has been illustrated, more may be used. There may be additional pairs each directly behind the front pair and forming its own bite. Also a single cluster could use three or more rollers. For example, a third roller, possibly of smaller diameter, behind the bite illustrated could form a bite with one roller 12 and have clearance with the other (where surfaces would rub if in contact) and its movement would direct the tassel through this second bite. Two angles of approach would thus be provided, and this could be advantageous.

Besides the metering of the supply of binder by the pumping thereof as described, it can be controlled by being supplied to a given level in the hollow roller shafts, or in a small reservoir sufficiently high for gravity feed from it to the rollers. Of course the main conventional tanks as used for spraying will carry a substantial supply from which the chosen gravity feed level will be supplied by pumping. The level may be determined by float control, or by overflow with return to the main tanks. Provision could theoretically be made to return excess from the rollers themselves to the tank, but this is less likely to be done, because of the danger that particles from the tassels might cause clogging.

Dripping of excess binder from the rollers can be minimized by feeding only at or near the top. Thus, with feed through a hollow shaft carrying a roller, the outflow perforations need not extend down to the bottom of the roller. Or with perforations extending to the bottom, a sliding plug, inserted from the bottom may be used to shut off one or more of the lower outflow perforations as is found to give best results. Feed to the rollers can also be by an external tube dripping or flowing onto them.

BINDER COMPOSITIONS

So many chemical compositions, especially polymers in water as a vehicle, can be used successfully as the binder in this invention that it may be unnecessary to do more than give examples. Polymerizing methods, such as suspension or emulsion polymerization, are well known to those skilled in the art.

EXAMPLE I

Thoroughly satisfactory results have been achieved with a 1 to 1 vinylchloride butyl acrylate copolymer latex diluted to approximately 16–18 percent solids. The copolymer latex was prepared by polymerizing equal weights of vinylchloride and butyl acrylate, with a resulting particle size of approximately 0.15 microns and a minimum temperature of film fusion (film formation) below 0° C. When sprayed, a hand spray was used with a pressure believed to be approximately 30 psi, and the rate of application was calculated at 5 to 10 gallons per acre. After application, the films of the polymer set rapidly and were still intact on the growing plants when observed 10 days later. During the course of these 10 days the plants had been subjected to drying winds and to a torrential downpour. Despite these adverse conditions, no shedding of the pollen was detected.

EXAMPLE II

The material of Example I has also been used successfully in a less diluted form, having about 50 percent solids. With roller application, this is preferred.

EXAMPLE III

The foregoing material has also been used mixed with other materials, with good results although the period of adequate protection is not now known to be longer than 4 days. One such mixture is represented by one part of the Example II latex, mixed with 0.6 part of a yellow corn dextrin and 0.06 part of a low molecular weight (10,000) 88 percent hydrolized polyvinyl alcohol commercially available as Gelvatol 20—30 dissolved in 2.9 parts of water. In another test, three parts of the Example II latex was mixed with four parts of a cationic fluidity waxy cornstarch dissolved in water at 25 percent solids, and the entire mixture diluted with 5 parts of additional water. The cornstarch had been prepared according to U. S. Pat. No. 2,917,506, specifically example 3 mentioned therein. In both of these modifications, observation four days after application showed no pollen being released.

Another binder found successful for at least four days comprised a copolymer emulsion, 50 percent solids, of dibutyl fumarate and vinyl acetate mixed in proportions containing 0.45 and 0.65 moles respectively, prepared to have a particle size of about 0.4 microns, and having a minimum film fusion temperature of 0° C. This polymer was diluted with an equal quantity of water and applied by spraying as in the case of Example I. In this instance it was noted that the emulsion penetrated the glume and retained its colloidal or emulsion character throughout the test so that the pollen was entrapped in the emulsion. This entrapment survived a torrential rain and gusty wind. From the foregoing it is apparent that in theory the binder may function either by forming a water resistant film surrounding the glumes and anthers, or by penetrating the glumes and anthers and remaining there as a water resistant gel entrapping the pollen. However, the formation of a water resistant film is deemed important from a practical standpoint because glumes closed too tightly for penetration of the binder might, unless coated by a film, open later and allow the enclosed anther to shed pollen.

Beyond the scope of present tests, a very wide range of materials is deemed suitable for use as the binders of this invention. Testing suitability is so easy that there is no need to attempt to designate all suitable compositions. Besides characteristics already indicated, some others desired will be obvious, including being nondeleterious (as used) to plant growth other than the tassel, and being nontoxic to animals if the plant is used as feed after the seed crop is harvested. Suitability for use with water as the vehicle is at present a requirement, although this is not intended to exclude the use of other vehicles if found suitable in cost and otherwise.

A wide range of fine particle-size dispersions in water of film-forming polymers is believed to be especially suitable. These include the following as homo or copolymers thereof:

Vinyl esters, e.g., vinyl acetate, vinyl propionate.

Acrylic esters, e.g., methyl, ethyl, butyl and 2-ethylhexyl acrylate.

Methacrylic esters e.g. butyl methacrylate and in combination with other softening comonomers methyl and ethyl methacrylate as well. Longer side chain acrylic and methacrylic esters up to the point where side chain crystallinity interferes with continuous film forming stability are also useful.

Vinyl halides, e.g., vinylchloride and vinylbromide, in conjunction with softening comonomers such as ethyl and butyl acrylate.

Vinylidene chloride and copolymers thereof with acrylic esters and acrylonitrile.

Acrylonitrile as a copolymer with softening comonomers like butadiene and acrylic esters.

Butadiene and copolymers with styrene such that continuous films result.

Styrene in conjunction with softening comonomers such as butadiene or acrylic esters.

Ethylene in conjunction with hardening comonomers such as vinyl acetate or vinyl chloride.

Vinyl butyral as combined with auxiliary additives that plasticize the polymer to allow film formation.

Maleate, fumarate, itaconate, citraconate esters e.g. dibutyl maleate, dioctyl fumarate which are copolymerizable with most vinyl monomers like vinyl acetate, styrene, vinyl chloride and so forth.

Additional comonomers — used with one or more of the above, in minor amounts of 10 percent or less by weight, are useful in getting specific latex or film properties like freeze-thaw stability, adhesion improvement. Typical of these would be acrylic and methacrylic acid, N-methylol acrylamide, maleate half esters, etc.

The influence of the comonomer composition is emphasized above, although it is recognized that non-film forming polymers, e.g., polystyrene, polyvinyl chloride can be modified, if necessary, with auxiliary plasticizing agents such as the phthalate esters to obtain continuous films, if desired, at ambient temperatures. Temporary plasticizers which leave the film after the water has evaporated are also useful auxiliaries to obtain film continuity. Examples of these are hexylene glycol, butyl carbitol acetate, Cellosolve, Texanol. In addition, those skilled in the art of film-forming polymers have learned that particle size also has an important bearing on the film continuity obtained. That is, smaller particle size latexes in the 0.1–0.3 micron average particle size range give more continuous and more water resistant films than latexes in the micron size range. The use of auxiliary plasticizer with large particle size materials can overcome or reduce the poorer film forming properties of large particle size latexes.

Within some of the broader concepts of this invention is applying to the exposed tassels, preferably in the binder, a material which renders the pollen non-viable, or kills the tassel before shedding viable pollen, or before a short-duration film deteriorates, but without other damage to the plants. Proposals of this general nature, at least in the form of individual-plant experiments toward killing the tassel at the very start of its growth, were made years ago. Practical success was not achieved, but the present invention may lead the way to success with variations working other than by the encasement or physical binding action which now seems to be the solution to the problem of avoiding or reducing detasseling.

ACHIEVEMENT

The coating of tassels with film-forming binder applied by machines moving along the seed-parent rows appears to be by far the best solution for a problem which has been vexing growers of hybrid corn seed throughout the decades of commercial corn hybridization. Hybrid corn is, of course, an extremely important aid to the corn farmer and hence to the public, with its many advantages including increased yields, uniformity for machine harvesting, disease resistance, stalk strength, and improved grain quality. When application is by rollers, there is so little wastage that binders high in solids content are economically used. This has advantages, including more rapid drying and film formation, less runoff, the hauling of less volume, and longer runs between stops for refilling of tanks.

We claim:

1. A method of preventing tasseling plants from shedding pollen which comprises applying throughout the pollen producing part of the tassel a binder which prevents the shedding of pollen.

2. A method according to claim 1 wherein said binder is a fine-particle dispersion in water of a polymer formed of at least one monomer wherein vinyl type linkages are present.

3. A method according to claim 1 wherein said binder is an aqueous solution or aqueous colloidal solution of polymer formed of at least one monomer wherein vinyl type linkages are present.

4. A method according to claim 1 wherein said binder includes, in water, a colloidally water soluble polymer, and another polymer as a fine particle dispersion, both polymers being formed of at least one monomer having vinyl type linkages.

5. A method of preventing tasseling plants from shedding viable pollen which comprises applying selectively to the tassel, and throughout the pollen producing part of the tassel, an encasing material which prevents the shedding of viable pollen.

6. A method of growing hybrid corn seed which comprises growing seed-parent corn plants in rows and pollinating-parent corn plants in rows parallel to the seed-parent corn rows, and shortly before pollen would otherwise be shed from the tassels in the seed-parent rows, applying selectively to the tassels in the seed-parent rows a binder which prevents the shedding of pollen.

7. A method of growing hybrid corn seed which comprises growing seed-parent corn plants in rows and pollinating-parent corn plants in rows parallel to the seed-parent corn rows, and shortly before pollen would otherwise be shed from the tassels in the seed-parent rows, applying to the tassels therein an encasing material which prevents the shedding of viable pollen.

8. A method of preventing tasseling plants from shedding pollen which comprises applying throughout the pollen producing part of the tassel a film-forming binder which forms a water resistant film which prevents the shedding of pollen.

9. A method of preventing tasseling plants from shedding pollen which comprises applying throughout the pollen producing part of the tassel film-forming polymer which forms a water-resistant film and prevents the shedding of pollen.

10. A method of preventing tasseling plants from shedding pollen which comprises applying throughout the pollen producing part of the tassel film-forming polymer which forms a water-resistant film and prevents the shedding of pollen; said film having good elongation characteristics to remain intact through appreciable plant growth.

11. A method of growing hybrid corn seed which comprises growing seed-parent corn plants in rows and pollinating-parent corn plants in rows parallel to the seed-parent corn rows, and shortly before pollen would otherwise be shed from the tassels in the seed-parent rows moving along each said row with a roller set having liquid binder thereon and applying said binder to the tassels therein by passage of the tassels through a bite between rollers of the set, thereby preventing the shedding of pollen.

12. A method of growing hybrid corn seed which comprises growing seed-parent corn plants in rows and pollinating-parent corn plants in rows parallel to the seed-parent corn rows, and shortly before pollen would otherwise be shed from the tassels in the seed-parent rows moving along each said row with a roller set forming a bite through which each tassel in said row passes, and with said rollers applying to the tassels a binder which prevents the shedding of pollen.

13. A method of growing hybrid corn seed which comprises growing seed-parent corn plants in rows and pollinating-parent corn plants in rows parallel to the seed-parent corn rows, and shortly before pollen would otherwise be shed from the tassels in the seed-parent rows moving along each said row with a roller set forming a bite through which each tassel in said row passes, and with said rollers applying to the tassels a material which prevents the shedding of viable pollen.

* * * * *